(12) United States Patent
Nivelet

(10) Patent No.: US 7,103,601 B2
(45) Date of Patent: Sep. 5, 2006

(54) METHOD FOR PRECONDITIONING AND ENCODING DATA TABLE, AND METHOD FOR THE IMPLEMENTATION OF TABLE REQUESTS ON A VECTORAL PROCESSOR

(75) Inventor: Bernard Nivelet, Maurepas (FR)

(73) Assignee: Bull S.A., Louveciennes (FR)

( * ) Notice: Subject to any disclaimer, the term of this patent is extended or adjusted under 35 U.S.C. 154(b) by 409 days.

(21) Appl. No.: 10/428,851

(22) Filed: May 5, 2003

(65) Prior Publication Data

US 2004/0002968 A1   Jan. 1, 2004

Related U.S. Application Data

(62) Division of application No. 09/701,611, filed on Dec. 1, 2000, now Pat. No. 6,950,817.

(51) Int. Cl.
*G06F 17/00* (2006.01)
*G06F 7/00* (2006.01)
(52) U.S. Cl. .......................... 707/100; 707/3
(58) Field of Classification Search ............ 707/1, 707/2, 3, 10, 4, 5, 102, 100, 104.1, 202; 705/1
See application file for complete search history.

(56) References Cited

U.S. PATENT DOCUMENTS 4,644,471 A    2/1987  Kojima et al.

5,899,988 A  *  5/1999  Depledge et al. ............... 707/3

OTHER PUBLICATIONS

Shun Ichi Torii et al: "accelerating non numerical processing by an extended vector processor"; Proceedings Of The Int'l Conference On Data Engineering, US, Washington, IEEE Comp. Soc. Press. vol. 1, Conf. 4, Jul. 1, 1988; pp. 194-201.
Korjima K et al.: "A Relational Database System Architecture Based On A Vector Processing Method" Proceedings Of the International Conference On Data Engineering, US Washington, IEEE Comp. Soc. Press, vol. Conf. 3, 1987, pp. 182-189, XP000757760.
Anonymous: "Query Processing with Existing Vector Feature Machines" IBM Technical Disclosure Bulletin, vol. 32, No. 5A, Oct. 1989, pp. 305-306, XP002124414, New York US.

* cited by examiner

*Primary Examiner*—Sam Rimell
(74) *Attorney, Agent, or Firm*—Miles & Stockbridge P.C.; Edward J. Kondracki

(57) ABSTRACT

The invention relates to a search engine (2) implemented by a decision application server (1) acting on a relational database (6) that contains a set of target records. The engine (2) is activated by queries for selecting records based on given criteria and comprises means (8) for preconditioning the database (6) supplying a preconditioned encoded table (10), periodically updated at the same time as the relational database (6) itself, to a machine with vectorial capabilities (9) in order for it to be processed. It also comprises means (7) for extracting target records, activated by the queries based on the result of the processing of the table (10) installed in the machine with vectorial capabilities (9), from the relational database (6).

Figure 1:
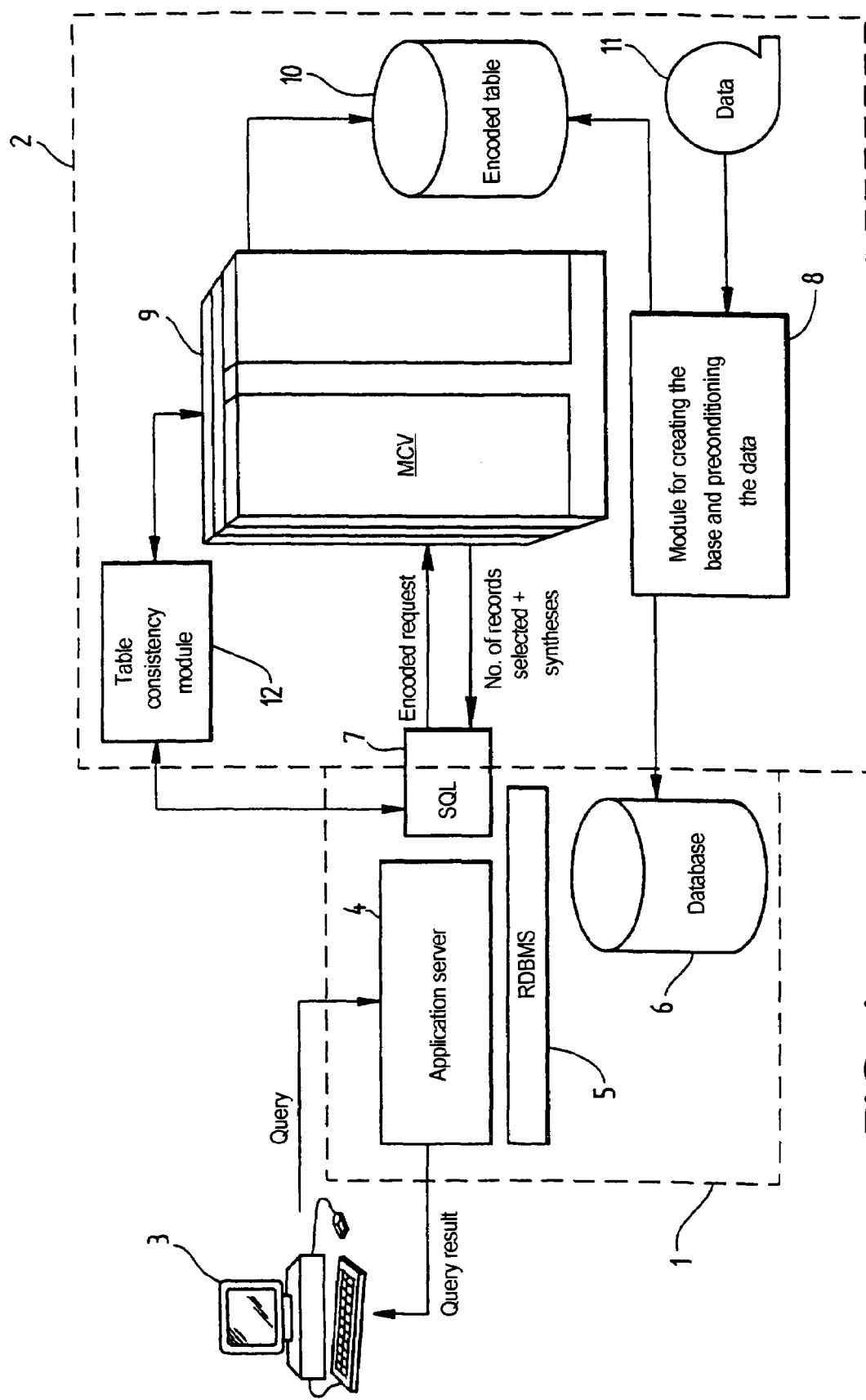

It particularly applies to data warehousing systems.

6 Claims, 3 Drawing Sheets

METHOD FOR PRECONDITIONING AND ENCODING DATA TABLE, AND METHOD FOR THE IMPLEMENTATION OF TABLE REQUESTS ON A VECTORAL PROCESSOR

This application is a divisional of application Ser. No. 09/701,611, filed Dec. 1, 2000 now U.S. Pat. No. 6,950,817.

The present invention relates to a method for preconditioning a data table designed to be used by a search engine responding to queries for selecting records based on given criteria.

It also relates to a method for searching for records, in response to a given query, in a data table, and a search engine acting on a data table containing a set of target records, activated by queries for selecting records based on given criteria.

The field of application is what is known as "data warehousing." More specifically, it relates to large historical databases, relatively stable over time, from which one wishes to extract populations defined by criteria with very frequent access and the shortest possible response times.

Typically, these bases can contain several million records, each of which can include hundreds of fields, and standard query response times are on the order of one second.

The potential clients for this type of base are essentially large-scale retail operations, banks and insurance companies.

Large-scale retail operations manipulate historical bases of accounts and purchase cards to search for target populations for direct marketing.

Banks and insurance companies also manipulate such historical bases related to customer orders, in order to search for populations, potential customers for new products, etc.

There are known solutions based on the use of parallelism to read records in storage units.

All of the known solutions use a mechanism for managing relational databases that are updated and consulted from a network environment. This mechanism is known by the abbreviation RDBMS (Relational Database Management System).

In a first type of solution, a wholly proprietary SQL (Standard Query Language) search engine is built on a highly parallel architecture based on multiprocessor nodes that control disks on which the database is distributed. The queries are divided up among the various nodes, then among the processors.

The main drawback of this solution is its cost/performance ratio, which is quite high. Thus, in order to achieve high performance, the configurations must be complex, hence very expensive.

A second type of solution uses standard relational database software in standard machines, generally multiprocessor machines.

In this second type of solution, a standard SQL search engine implements the high parallelism, in accordance with the same principles as the solutions of the first type but with architectural variants in the mechanisms for dividing up the queries and in the management of the cache memories.

The drawbacks of this second type of solution are the same as those of the first type, aggravated by a loss of performance due to the complexity of the software, which is a consequence of its generality.

The object of the invention is specifically to eliminate these drawbacks by providing a search engine powerful enough to execute queries for selecting records based on criteria, in a very short time, on the order of a few seconds, in databases that are large but stable over time (updated periodically, every night at most).

To this end, the first subject of the invention is a method for preconditioning one or more data tables of a decision application server intended to be processed by a search engine responding to queries for selecting records based on given criteria, sent by the decision application server.

The method according to the invention consists of:

analyzing the predicates contained in the fields of the records intended to fill the relational database in accordance with given authorized relations;

creating a nomenclature for the predicates from this analysis;

numerically encoding the predicates in accordance with the nomenclature, taking the nature of the predicates and the relations to be implemented in the predicates into account in the queries.

Finally, it consists of presenting the encoded predicates in the form of a table of numeric values.

The second subject of the invention is a method for searching for records in a data table in response to a given query, consisting of installing a copy of the table of numeric values obtained via the preceding method in a machine with vectorial capability performing the processing of the numeric values of the table in accordance with the query served by the decision application server.

Finally, its third subject is a search system implemented by a decision application server comprising a relational database containing a set of target records, and a search engine coupled with the decision application server, activated by a query for selecting records based on given criteria sent by the decision application server.

According to the invention, the system is characterized in that the engine includes means for preconditioning the data from the base and installing an encoded table corresponding to the base in a machine with vectorial capabilities, these means comprising:

means for reading a data file corresponding to the base;

means for building a nomenclature for the values of the fields contained in the preceding file;

means for encoding fields in accordance with the nomenclature, taking the nature of the fields and the relations to be implemented in the predicates into account in the query;

means for analyzing queries sent by the decision application server, taking into account the authorized relations, the constraints on the predicates and the nomenclature; and means for encoding the filtered query into a set of vectors containing the values to be found in the fields in accordance with the associated relations, in the form of an input file usable by the machine with vectorial capacities.

The system also includes means for extracting in plaintext the data sought in the result file obtained as output from the machine with vectorial capacities, using search means installed in the decision application server.

Statistical syntheses can also be performed on the results of the search.

The invention has the particular advantage of providing very short response times that are impossible using RDBMS techniques, and a high query throughput.

It has the further advantages of being transparent for the existing application and of having no impact at the applicative level.

Figure 2:
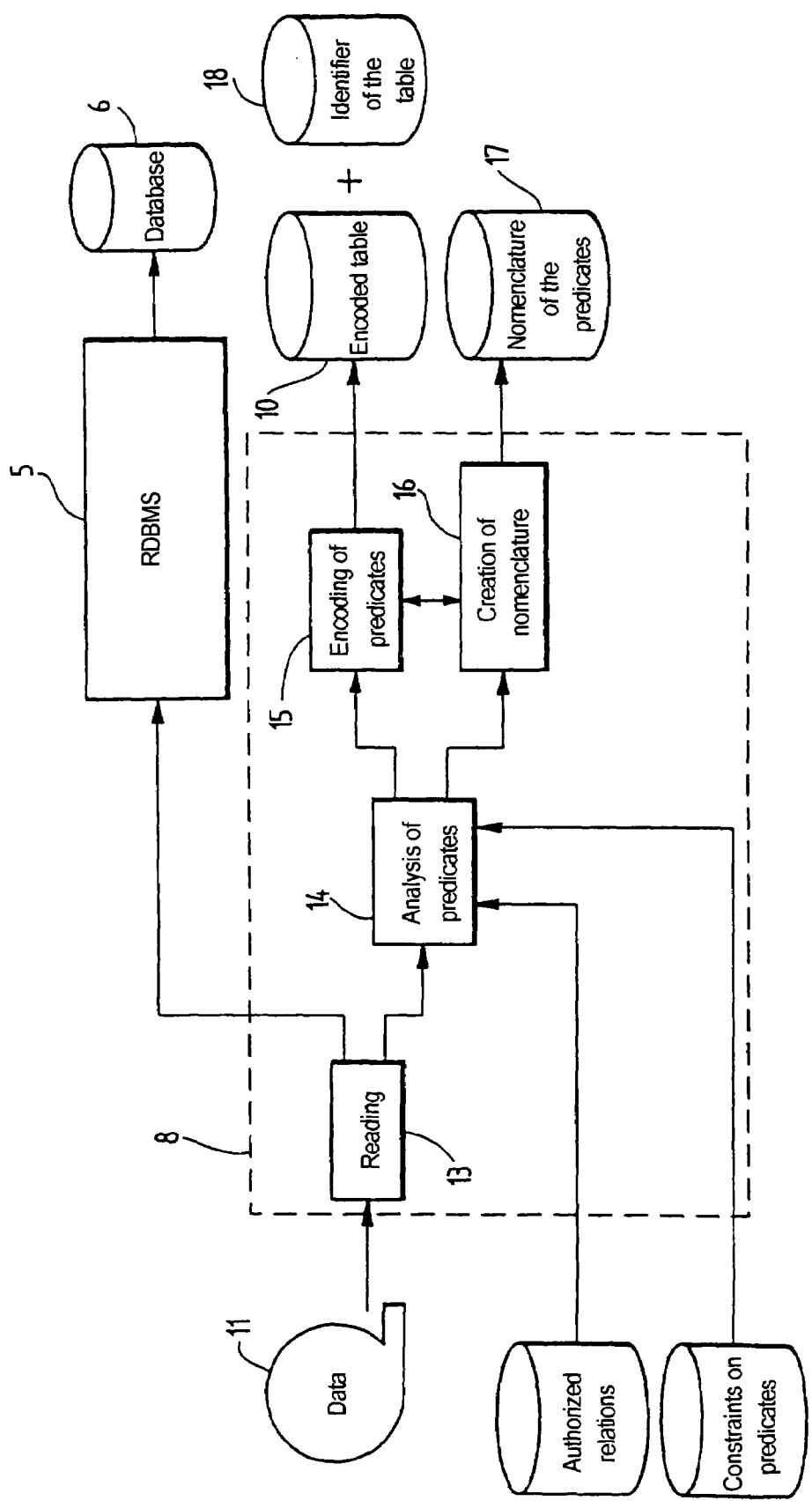
Figure 3:
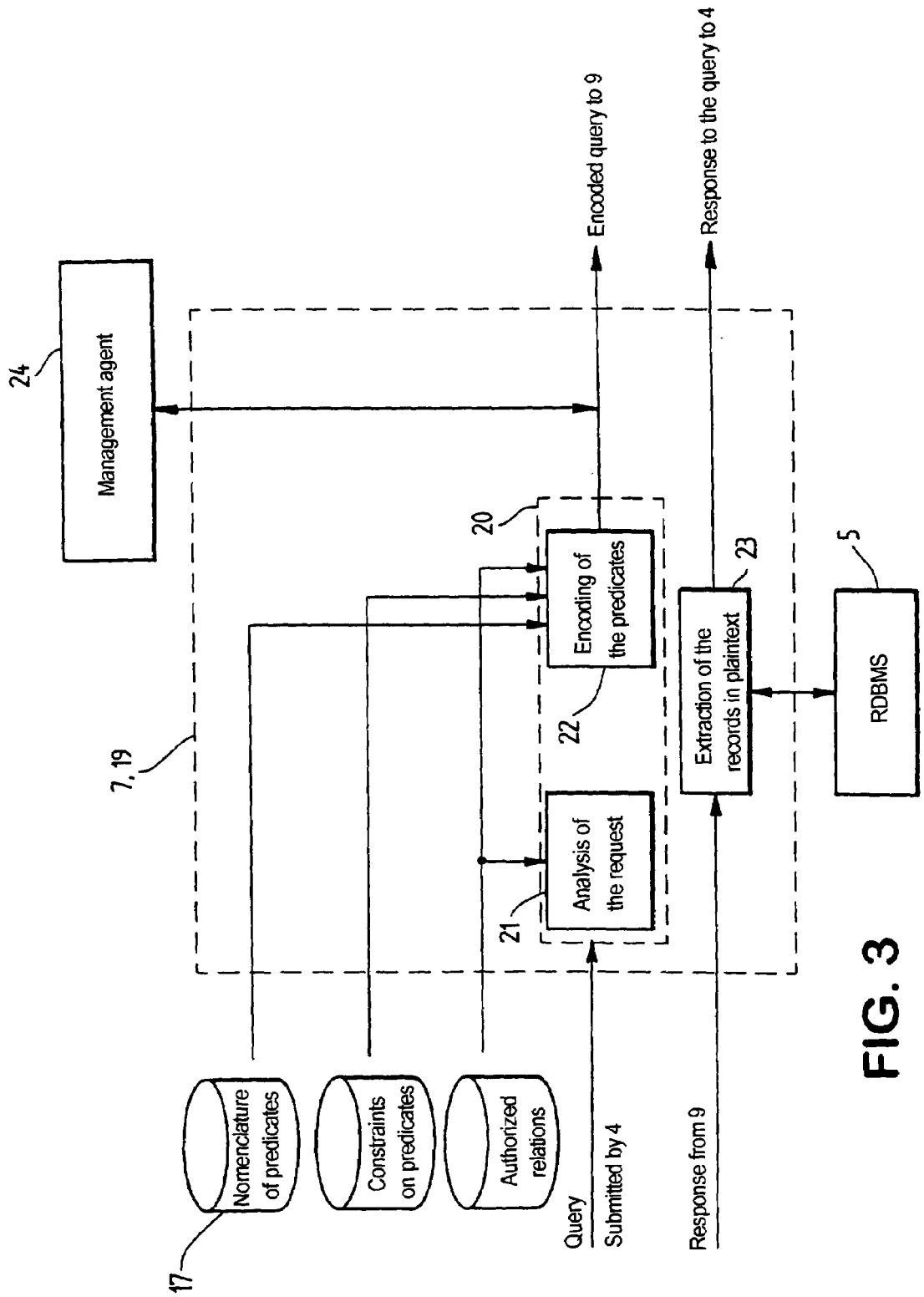

Other advantages and characteristics of the present invention will emerge through the reading of the following description, given in reference to the attached figures, which represent:

FIG. 1, a schematic diagram of a search system using a search engine according to the invention;

FIG. 2, a schematic diagram of a module for preconditioning and installing the database, according to the invention; and FIG. 3, a schematic diagram of a SELECT agent according to the invention.

In these figures, the homologous elements are designated by the same numerical references.

The principle of the invention is described below, and its illustration is based on the use of a vectorial machine known as a supercomputer.

Such a machine is characterized by processors having several arithmetic units, or "pipelines," and by enough memory bandwidth to supply power to all the processors at each clock peak.

However, the invention is not limited to this type of machine and applies to any machine with vectorial capabilities, i.e. machines whose performance is comparable to that of vectorial supercomputers.

In fact, the current scalar computers include several arithmetic operators, and memory bandwidths are increasing as a result of the use of what is known as "crossbar" technology. It is therefore foreseeable that in the near future, the performance of scalar computers will be comparable to that of vectorial supercomputers.

Vectorial supercomputers currently offer a response to the ever-increasing demand for performance in the fields of science and of industry in general.

Today, vectorial machines are the only ones that can meet the constraints already expressed in the preamble of the present description.

The basic idea of the invention is to take advantage of the exceptional power of machines with vectorial capabilities in order to perform comparisons on numeric vectors, encoded images of the fields of the data table.

The transformation into numbers of the data in the table to be processed and the formation of a nomenclature from these numbers are performed during the installation of the relational database.

The encoding of the data into numbers has the other advantageous effect of compacting the data of the base. Thus, as opposed to solutions of the RDBMS type, which manipulate the plaintext content of each field, the method according to the invention acts only on a number representing this field.

The table thus compacted can generally be contained in memory (no disk input/output) or can be loaded into memory in columns, which represents only reduced input/output volumes.

Finally, the invention offers the capability to adapt the encoding to the types of queries that are served. It also makes it possible to implement an effective optimization of the processing.

FIG. 1 illustrates a schematic diagram of a search system using a search engine according to the invention.

The search system comprises, on the left side of the figure, a decision application server 1, representing the general case, delimited by an enclosing broken line, and the search engine 2, on the right side of the figure, delimited by an enclosing broken line.

The decision application system 1 is coupled with a user (or client) station 3.

The decision application system 1 comprises an application server 4 that generates predefined queries, an RDBMS 5 that manages a database 6, and an SQL agent 7 in charge of analyzing the queries submitted by the application server 4, and possibly extracting the target records from the base 6, relying on the RDBMS 5.

The user (the client) sends, via the application server 4, queries corresponding to characteristics of target records that meet given criteria, and receives from the same server 4 the result of the queries in the form of either a list of records that meet the criteria or statistical syntheses, or both.

The engine 2 implements a module 8 for preconditioning the data table and uses the resources of a supercomputer 9 to process a copy 10 of the preconditioned table in order to extract the target records. The module 8 for preconditioning the data table receives the data, for example imported from a data bank 11. This data is organized in the form of a table and numerically encoded in a format that is directly usable by the supercomputer 9 and executable in an optimal way by the queries.

A copy of this table is accessible by the supercomputer 9. It resides, for example, in the memory space of the supercomputer 9 and can be partitioned if its size exceeds that of the available memory.

The supercomputer 9 received from the SQL agent 7 the translation of the queries submitted by the application server 4 in the form of an input file.

The supercomputer 9 then processes this input file using a given search program that takes maximum advantage of the power of the pipelines of the supercomputer 9 while working on the columns of the copy 10 of the table.

At the end of the processing, it delivers as output, in the form of a file, the results of the processing performed, which corresponds to a list of the line numbers of the records selected by the search, and possibly to statistical syntheses requested on the records found.

If plaintext records are requested, the SQL agent 7 operates on the result file to extract the selected records in plaintext from the relational database 6.

The SQL agent 7 then transmits the results (selected records and/or statistical syntheses) in the form of an SQL response to the application server 4 that sent the query.

A table consistency module 12, accessible to the SQL agent 7, contains a list of the identifiers of the tables present and the nomenclature of the predicates for each of them.

FIG. 2 illustrates a schematic diagram of the module 8 for preconditioning and installing the table, according to the invention, delimited by an enclosing broken line.

It comprises first means 13 for reading data imported on any medium, record by record, as input into the module, for example originating from a data bank 11.

The read records are then completed with their number and transmitted to the relational database management system 5, which creates the plaintext data base 6 in the decision application server 1.

It also comprises second means 14 that analyze the predicates in the records in accordance with authorized relations and constraints on the predicates.

Two examples of constraints on the predicates are given below:

In a first example, a column of the database includes only numeric values. In this example, it is not necessary to numerically encode what is already numeric.

In a second example, a column of the data base contains only words, whose alphabetical order will be used in the searches. In this example, the analysis of the predicate will take this relation into account in the numerical encoding of the predicate (in order to preserve the order).

Third means 15 encode the values of the predicates issued by the second means 14. This encoding consists of replacing the values of the fields by their indexes in the nomenclature of possible values.

Fourth means 16 create a nomenclature for the predicates issued by the second means 14 in accordance with the encoding by the third means 15.

The preconditioning module 8 also provides the identifier of the encoded base.

The encoded table, the nomenclature of the predicates and the identifier of the base are presented in the form of files, respectively referenced 10, 17, and 18 in the figure.

FIG. 3 illustrates a schematic diagram of a SELECT agent 19 according to the invention. It substitutes for the SQL agent 7 of the decision application server 1 that hosts it.

It comprises means 20 for transforming queries, delimited by an enclosing dotted line, which queries are submitted by the application server 4 in accordance with the nomenclature of the predicates 17, the constraints on the predicates and the authorized relations.

The transformation means 20 comprise means 21 for analyzing the SELECT query and means 22 for encoding the predicates.

The query analyzing means 21 translate the query into a set of vectors representing fields to be found and relations implemented, taking into account the authorized relations.

The vectors are then encoded by the means for encoding the predicates in accordance with the nomenclature of the predicates, the constraints on the predicates and the authorized relations.

There are as many vectors as there are possible values in the fields of the table.

The analysis also makes it possible to build, for each of these vectors, a vector defining what type of comparison to perform for each of the field vectors.

The vectors are organized in the form of an input file usable by the supercomputer 9.

A search program integrated into the supercomputer executes the comparisons between the vectors and all the lines of the table.

These comparisons are performed column by column.

In case of the coincidence of a line, its number is saved and the response provided by the supercomputer to the SQL agent 7 is presented in the form of a result file comprising the list of the numbers corresponding to the lines selected. The requested statistical syntheses are calculated from this file.

An extraction module 23 then constructs, if requested, the plaintext response addressed to the application server 4 that sent the query, by extracting from the relational database 6 the records corresponding to the list of the line numbers of the result file from the supercomputer 9, using the record number added to the base 6.

The SELECT agent 19 also supplies the identifier of the table. The table consistency module 12 controls the identity of the table to be processed in case of a plurality of tables.

A management agent 24 is also coupled with the SELECT agent 19 and makes it possible to monitor the activity of the supercomputer 9 and handle abnormalities. It also activates the loading of the search program into the supercomputer 9.

The invention claimed is:

1. A search system having a decision application server comprising a relational database containing a set of target records, a search engine coupled with the decision application server, the search engine being activated by a query for selecting records from the set of target records based on a given criteria sent by the decision application server, the search engine comprising a module for preconditioning data intended for the relational database and installing an encoded table corresponding to the relational database in a machine with vectorial capabilities, the module further comprising:
    means for reading a file having data intended for the relational database;
    means for building a nomenclature for the data contained in the file, the nomenclature being based on, and built subsequent to, an analysis of the data; and
    means for encoding the data in accordance with the nomenclature to produce the encoded table; and the search engine further comprising:
    means for analyzing the query sent by the decision application server; and
    means for encoding the query, in accordance with the nomenclature, into an encoded query in a form of an input file usable by the machine with vectorial capabilities, the encoded query comprising at least one vector.

2. The system according to claim 1, wherein the search engine further comprises means for receiving the input file, searching the encoded table in accordance with the vector of the input file, and producing a result of the search in the form of an output file.

3. The system according to claim 2, further comprising a means for extracting in plain-text the target records from the relational database corresponding to the output file produced by the machine with vectorial capabilities.

4. The system according to claim 3, wherein the means for extracting is installed in the decision application server.

5. The system according to claim 1, further comprising a management agent that monitors activity of the machine with vectorial capabilities, handles abnormalities, and activates search means in the machine with vectorial capabilities.

6. The system according to claim 1, wherein the search engine further comprises the machine with vectorial capabilities.

\* \* \* \* \*

UNITED STATES PATENT AND TRADEMARK OFFICE
CERTIFICATE OF CORRECTION

| | | |
|---|---|---|
| PATENT NO. | : 7,103,601 B2 | Page 1 of 1 |
| APPLICATION NO. | : 10/428851 | |
| DATED | : September 5, 2006 | |
| INVENTOR(S) | : Bernard Nivelet | |

It is certified that error appears in the above-identified patent and that said Letters Patent is hereby corrected as shown below:

Title Page, item (30) insert the following priority information:

Foreign Application Priority Data

| October 11, 1999 | (WO) | PCT/FR99/02441 |
| April 2, 1999 | (FR) | 99 04130 |

Signed and Sealed this

Twenty-first Day of November, 2006

JON W. DUDAS
*Director of the United States Patent and Trademark Office*